US008510045B2

(12) United States Patent
Rueben et al.

(10) Patent No.: US 8,510,045 B2
(45) Date of Patent: Aug. 13, 2013

(54) DIGITAL MAPS DISPLAYING SEARCH-RESULTING POINTS-OF-INTEREST IN USER DELIMITED REGIONS

(76) Inventors: Steven L. Rueben, Las Vegas, NV (US);
Gabriel Jakobson, Las Vegas, NV (US)

( * ) Notice: Subject to any disclaimer, the term of this patent is extended or adjusted under 35 U.S.C. 154(b) by 574 days.

(21) Appl. No.: 12/799,471

(22) Filed: Apr. 26, 2010

(65) Prior Publication Data

US 2011/0153186 A1  Jun. 23, 2011

Related U.S. Application Data

(60) Provisional application No. 61/284,755, filed on Dec. 22, 2009.

(51) Int. Cl.
*G06F 17/30* (2006.01)
*G06F 3/01* (2006.01)

(52) U.S. Cl.
USPC ........... 701/532; 701/439; 701/438; 701/426; 701/411; 340/990; 340/995.21; 707/769; 715/781; 715/702

(58) Field of Classification Search
USPC ................. 701/426, 438, 200, 532; 715/702; 707/769
See application file for complete search history.

(56) References Cited

U.S. PATENT DOCUMENTS

| | | | | |
|---|---|---|---|---|
| 7,082,365 | B2 * | 7/2006 | Sheha et al. | 701/426 |
| 7,089,110 | B2 * | 8/2006 | Pechatnikov et al. | 701/411 |
| 8,014,943 | B2 * | 9/2011 | Jakobson | 701/439 |
| 2003/0036848 | A1 * | 2/2003 | Sheha et al. | 701/209 |
| 2004/0030493 | A1 * | 2/2004 | Pechatnikov et al. | 701/208 |
| 2004/0204836 | A1 * | 10/2004 | Riney | 701/208 |
| 2006/0200383 | A1 * | 9/2006 | Arutunian et al. | 705/14 |
| 2009/0210388 | A1 * | 8/2009 | Elson et al. | 707/3 |
| 2009/0319166 | A1 * | 12/2009 | Khosravy et al. | 701/200 |
| 2011/0153186 | A1 * | 6/2011 | Jakobson | 701/200 |
| 2011/0264370 | A1 * | 10/2011 | Jakobson et al. | 701/209 |
| 2011/0313657 | A1 * | 12/2011 | Myllymaki et al. | 701/208 |
| 2012/0046861 | A1 * | 2/2012 | Feldbauer | 701/426 |

* cited by examiner

*Primary Examiner* — Thomas Black
*Assistant Examiner* — Wae Louie

(57) ABSTRACT

A method, system and apparatus for displaying points-of-interest ("POIs") on a digital map are disclosed. One such method includes: presenting a digital map on a graphical display of an electronic device, wherein the digital map comprises map tiles and corresponds to a geographic region; receiving free-hand user input selecting a portion of the digital map; delimiting the portion of the digital map selected by the user; determining one or more of the POIs whose geographic coordinates are within the portion of the digital map selected by the user; and displaying a graphic for each of the determined POIs, wherein the displayed graphic is displayed on the digital map at the geographic coordinates of each of the determined one or more POIs.

28 Claims, 19 Drawing Sheets

DIGITAL MAPS DISPLAYING SEARCH-RESULTING POINTS-OF-INTEREST IN USER DELIMITED REGIONS

CROSS-REFERENCE TO RELATED APPLICATIONS

This patent application claims priority to Provisional Patent app No. 61/284,755 filed on Dec. 22, 2009.

FIELD OF INVENTION

The present invention generally relates to mapping on electronic devices. More particularly, the present invention relates to selecting an arbitrary region on a digital map, displayed on an electronic device, and displaying points-of-interest ("POIs") on the digital map which are within the geographic confines of the arbitrary region.

BACKGROUND OF THE INVENTION

Mapping applications accessible by electronic devices often allow users to select and display POIs on a digital map. For example, a user of a smart phone, connected to a mapping service accessible over the internet, can enter a search query such as "Pete's Coffee, San Francisco" or "Best Coffee, Seattle". The mapping service delivers to the user map tiles (e.g. tiles of a map, satellite photo, etc.) which are displayed as a contiguous map on the electronic device. The mapping service then displays icons (i.e. graphical representations) of business and places (collectively POIs) super-imposed on the digital map at the corresponding geographic locations. The user can then click on a POI icon and receive more information on the POI, navigate to a website associated with the POI, etc.

At present, a user can delimit the POIs displayed by manipulating the search query. For example, the user can modify the parameters of a search query, changing a name of a city or introducing more criteria into the search, resulting in a smaller subset of POIs displayed. The user can also manipulate the map: zoom or pan, to alter the POIs displayed.

What is lacking at present, and in any prior art, is any way for a user to graphically select a region of a map, for example by outlining an arbitrary region on a touch-screen in a "free-hand" fashion, and, displaying only those POIs that are within the outlined region.

SUMMARY OF THE INVENTION

In general, a method and system for combining search results (i.e. query resulting in one or more POIs) with an arbitrary region of a digital map are disclosed. A digital map, comprising map tiles served by a mapping service (e.g. Google Map®, Microsoft Bing® Maps, etc.) displayed on an electronic device (e.g. smart phones and handheld computing devices such as iPhone®, Droid® etc. or GPS navigation devices such as Magellan®, Garmin®, etc.) includes POIs (e.g. businesses, attractions, etc.) only within a specific region of the electronic map. In one embodiment, a user can input an arbitrary region (e.g. by sliding his/her finger across a touch-screen and highlighting one or more arbitrary polygonal regions on a displayed digital map). In conjunction with selecting an arbitrary region, the user can enter a search query resulting in various POIs (e.g. coffee shops, gas stations, etc.) The POIs retrieved by the mapping application (e.g. based on the search query, dimensions of the map and any other logic used by the mapping application) are then further filtered to produce a subset of POIs which are within the geographic confines of the user's selected region. Only the POIs in the subset are then displayed on the digital map. In another possible embodiment, the "user-selected arbitrary region" discussed above may be an automatically-selected region surrounding a route displayed by the mapping application, onto which the user may add additional region(s). For example, the mapping application may display a route over a dozen streets from point A to point B, making the "selected region" the dozen streets comprising the route (alternatively, also including a user-defined region a certain offset from the route.) The user may then manipulate the selected route-based-region and display only POIs contained within the newly-defined region resulting from the user's manipulation.

DESCRIPTION OF THE DRAWINGS

For a more complete understanding of the present invention and further advantages thereof, references are now made to the following Detailed Description, taken in conjunction with the drawings, in which.

DETAILED DESCRIPTION

Figure 1A:
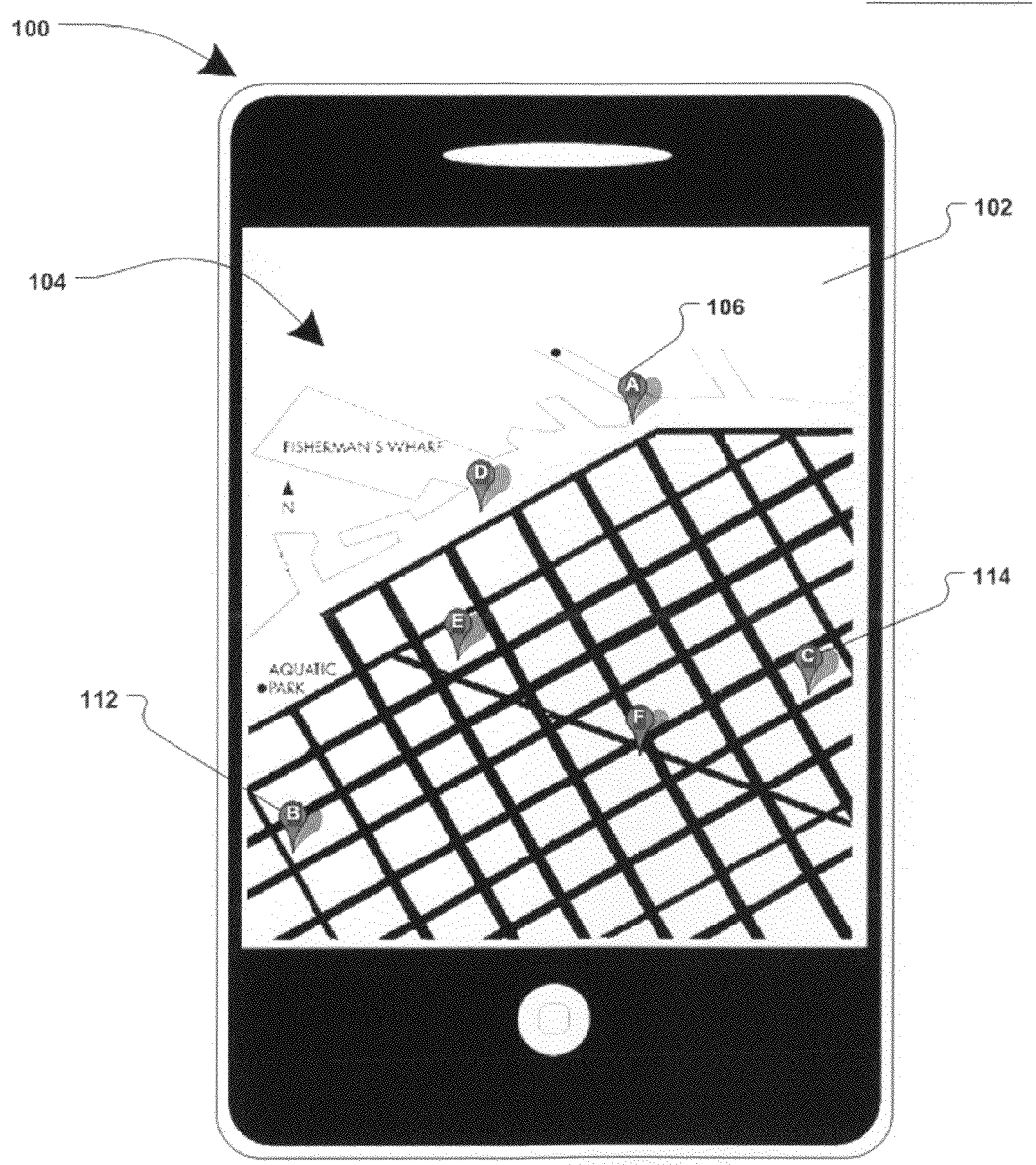
FIGS. 1A & 1B are generalized block diagrams illustrating a main difference between the prior art, shown in FIG. 1A and a system operating in accordance with the present invention, shown in FIG. 1B, according to one embodiment of the present invention.
Figure 1B:
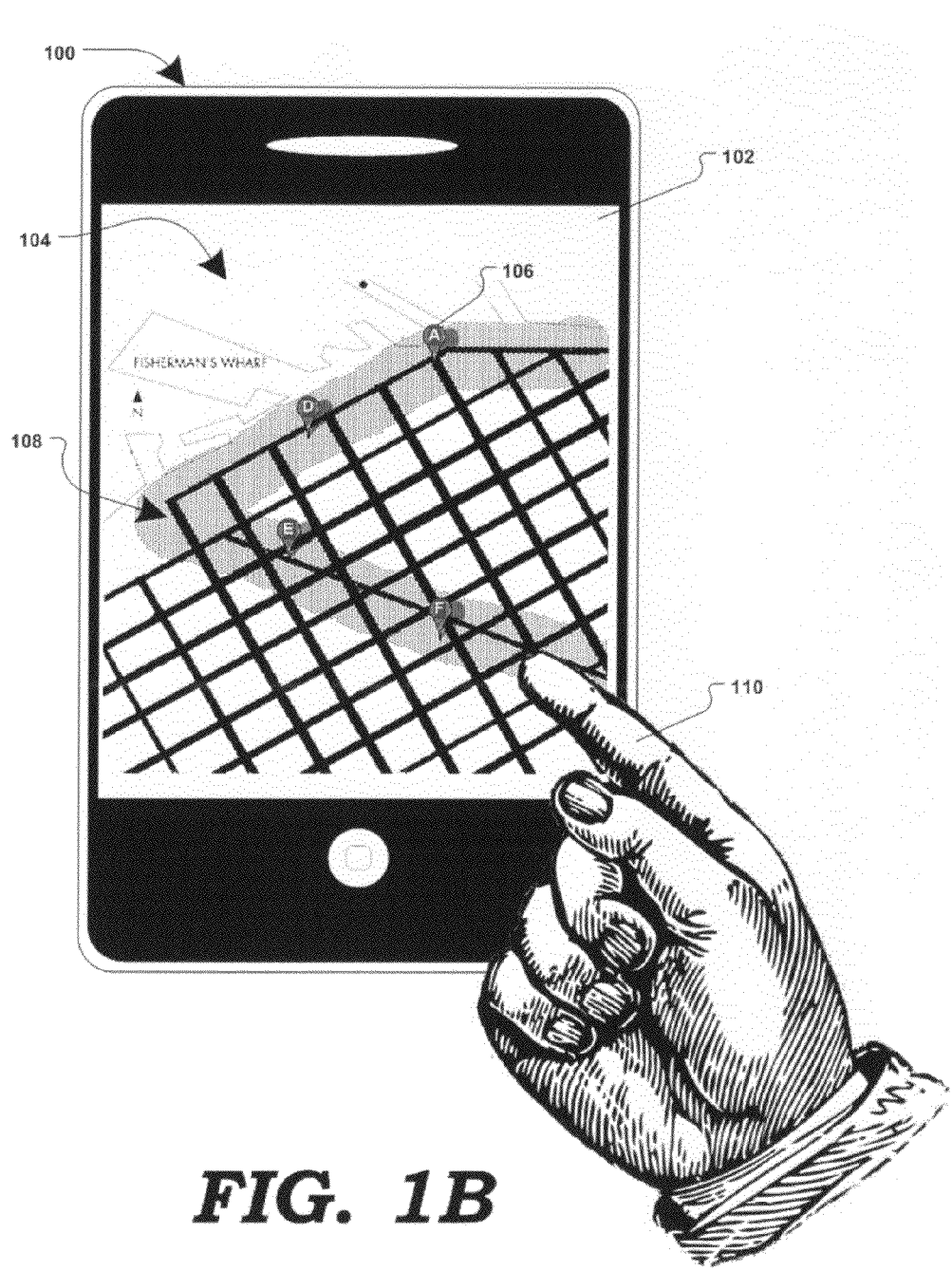

FIGS. 1A & 1B are generalized block diagrams illustrating a main difference between the prior art, shown in FIG. 1A and a system operating in accordance with the present invention, shown in FIG. 1B, according to one embodiment of the present invention. Both figures demonstrate a digital map displayed on an electronic device. Both maps display icons (i.e. graphical representations of POIs, or places/businesses on a map.)

In the prior art, shown in FIG. 1A, POIs are displayed throughout the entire visible digital map (alternatively, in the prior art, POIs may be displayed in a region based on some pre-determined rule, such as displayed POIs within a city, for example.) An electronic device 100, having a display 102, displays a digital map 104. The digital map 104 may display POIs "A" 106, "B","C","D","E" and "F".

In many cases, these POIs are the result of a user query. For example, a user may have typed a query such as "coffee in San Francisco", in response to which a mapping server which delivered map tiles comprising the digital map 104, may have identified POIs "A"-"F", representing physical POIs that are the result of the search, and may display the POIs as icons "A" 106-"F" on the digital map 104. In the prior art, there does not exist a way for the user to graphically limit the POIs to a specific geography (or region(s)) on the digital map 104.

Referring now to FIG. 1B, according to one preferred embodiment of the present invention, a user can select an arbitrary region 108 on the digital map 104. For example, the user can use a pointing device or touch the screen (illustrated here with a finger/hand 110 touching the physical display 102 of the electronic device 100) to highlight the region 108.

Once the user has outlined/selected the region 108, only a subset of the POIs "A"-"F" (in FIG. 1A)—those POIs within the region 108—are displayed. The POIs "A","D","E" and "F" are displayed on the digital map 104; however, the POIs "B" and "C"—displayed in the prior art on the map 104 in FIG. 1A—are not displayed in FIG. 1B. The previous POIs "B" and "C" are outside of the user selected region 108, and thus are not displayed.

For example, a user may decide to spend some time in a region of a city (in this example, on and around Embarcadero and Columbus streets in San Francisco.) The user may be interested solely in seeing coffee shops that are either on these streets, are very close to these streets. According to the present invention, the user can input an ordinary query (e.g. "coffee in San Francisco") and then user his/her finger to generally highlight the area where he/she expects to be. The only coffee shops displayed will be ones in the highlighted area (despite the generality of the query which technically would return all coffee shops in San Francisco.) As the user adds to, or subtracts from, the highlighted area, so do the displayed results vary to include only those that are within the highlighted area.

Figure 2A:
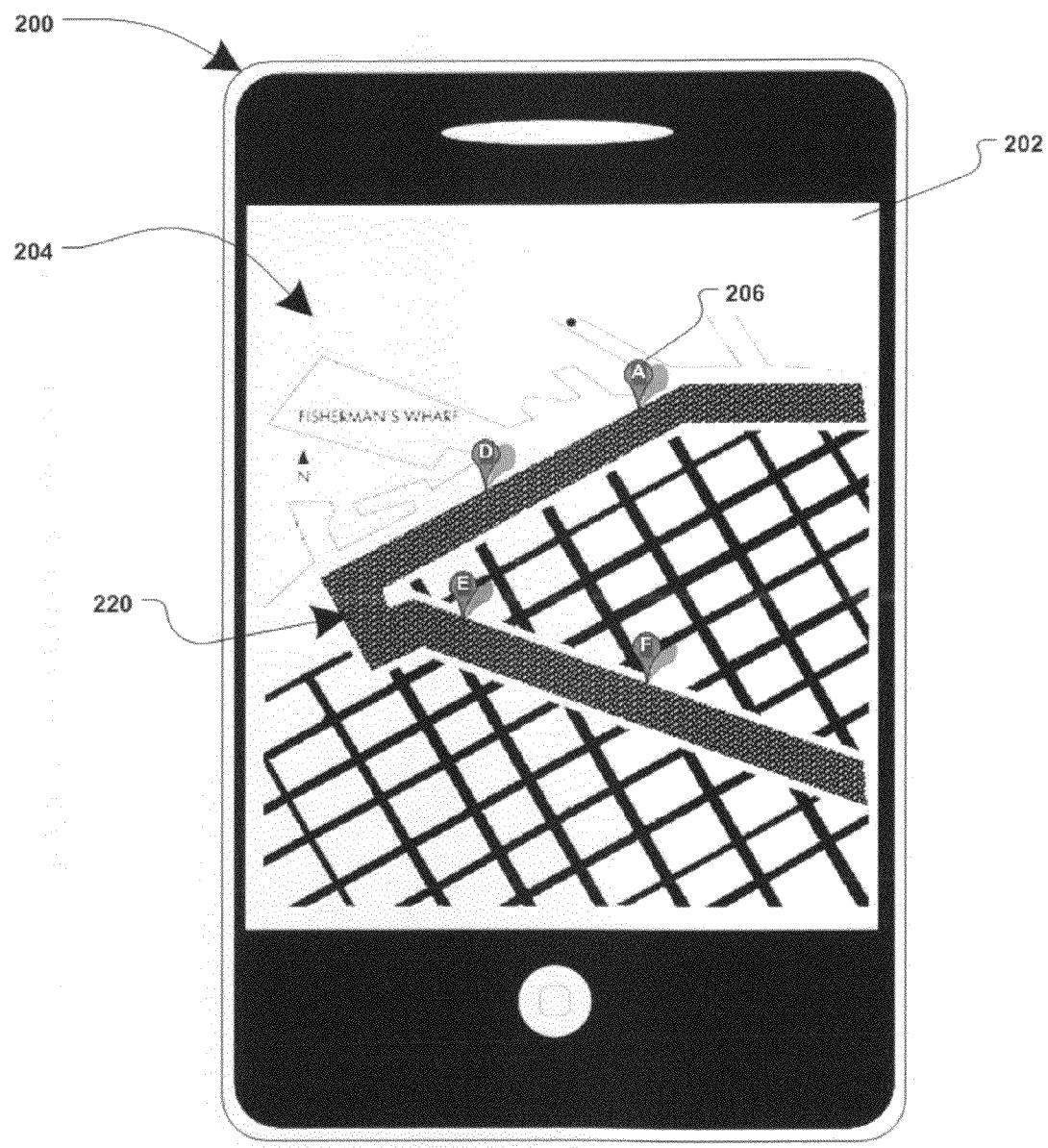
FIGS. 2A & 2B are generalized block diagrams illustrating a main difference between the prior art, shown in FIG. 2A and a system operating in accordance with the present invention, shown in FIG. 2B, according to various embodiments of the present invention.
Figure 2B:
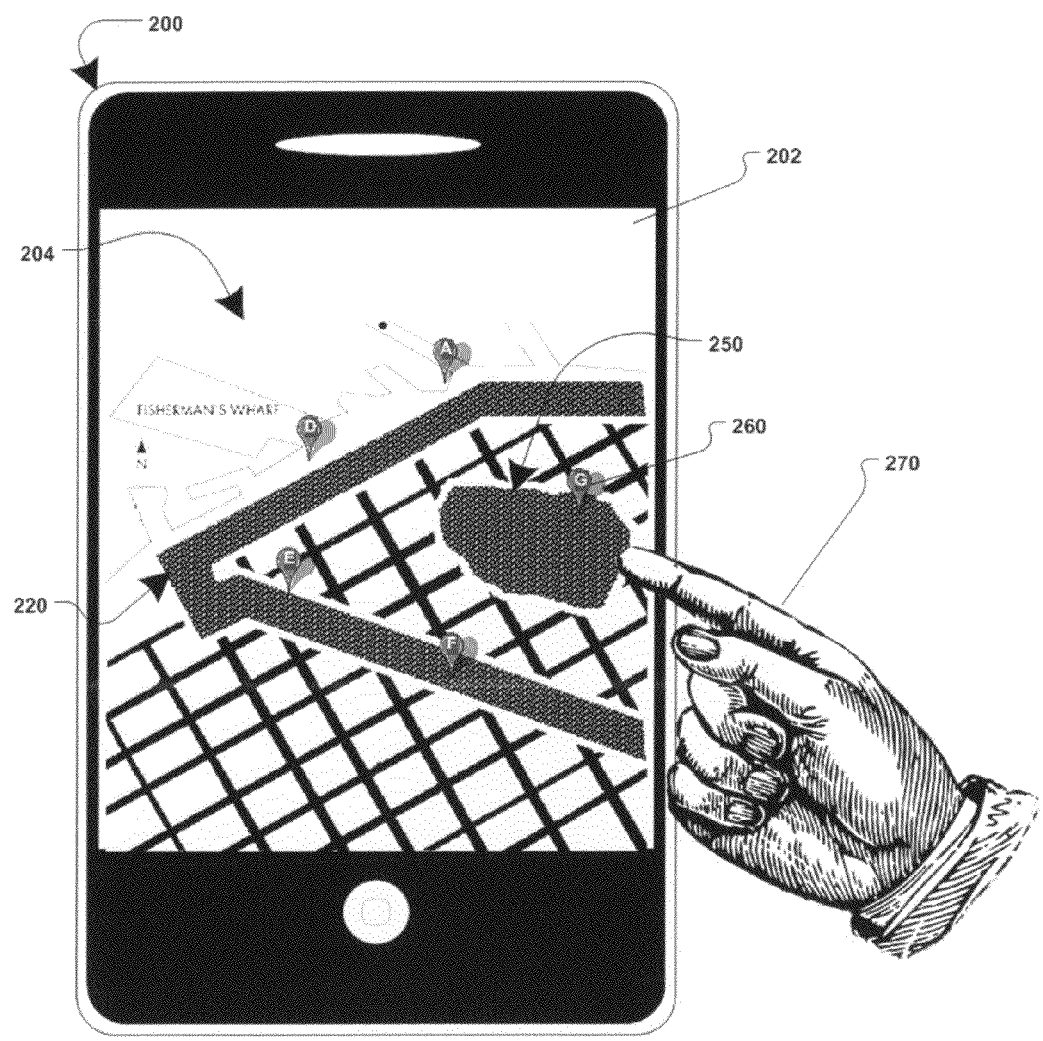

FIGS. 2A & 2B are generalized block diagrams illustrating a main difference between the prior art, shown in FIG. 2A and a system operating in accordance with the present invention, shown in FIG. 2B, according to various embodiments of the present invention.

FIGS. 2A and 2B demonstrate a digital map displayed on an electronic device. Digital maps display icons (i.e. graphical representations of POIs, or places/businesses on a map) as well as routes. A route is a common feature from mapping services such as Google Maps®, Yahoo! Maps®, Microsoft Bing Maps®, MapQuest®—as well as numerous mapping applications on smart phones, hand-held devices and GPS navigation devices. A route is displayed on a digital map commonly in response to a user's input of a starting-point, an end-point and criteria.

Referring to FIG. 2A, in the prior art, a mapping application running on an electronic device 200, displaying a digital map 204 on a display 202, can display a route 220. The user may choose to display only POIs along the route, in this e.g. "A" 206, "D","E" and "F", to be displayed. In the prior art, all POIs returned by a search query are displayed; or alternatively, when a route is displayed, only POIs on or near the route are displayed.

Referring now to FIG. 2B, in one embodiment of the present invention, the user may add a region to the existing route. For example, a mapping service may display a route to a user and show all POIs along the route. For example, the user may think about parking and walking somewhere along the route. With the advent of the present invention, the user may highlight a new region 250 on the digital map 204.

POIs in the new region 250, e.g. POI "G" 260, may now be displayed in addition to the POIs "A","D","E" and "F", previously-displayed along the route 220 in the prior art. The user may select criteria for generating the route 220 on the digital map 204 displayed on the electronic device 200. The user may then use his/her finger 270 (or a pointing device) to touch the screen 202 of the electronic device 200 to highlight the new region 250. In response, a new POI "G" 260 may be displayed in association with the new region 250, in addition to the other POIs "A","D","E" and "F" previously displayed in association with the route 220.

Figure 3A:
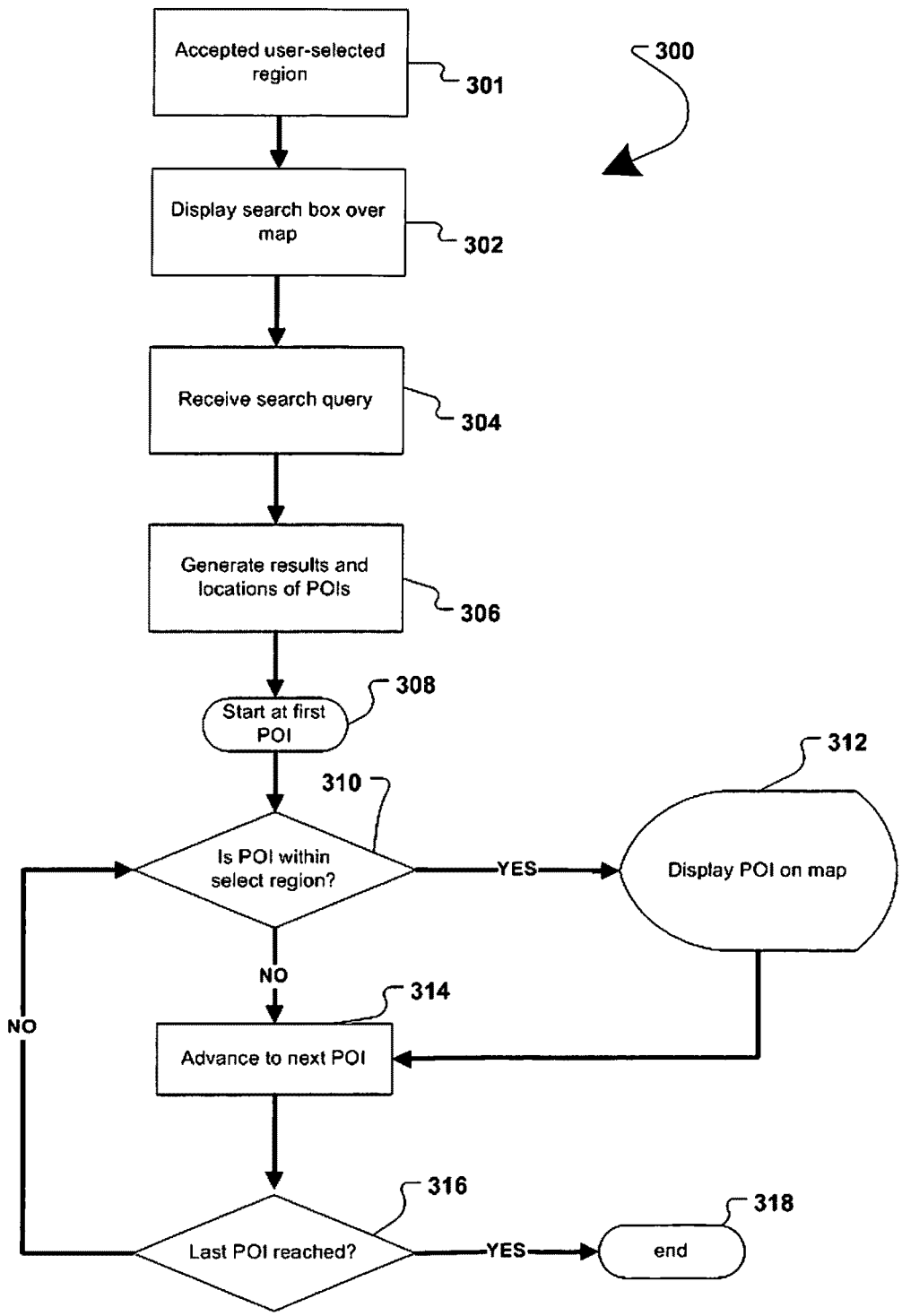
FIGS. 3A & 3B are generalized flow diagrams illustrating retrieving and displaying POIs in a new region of a digital map, the new region selected by a user, according to various embodiments of the present invention.
Figure 3B:
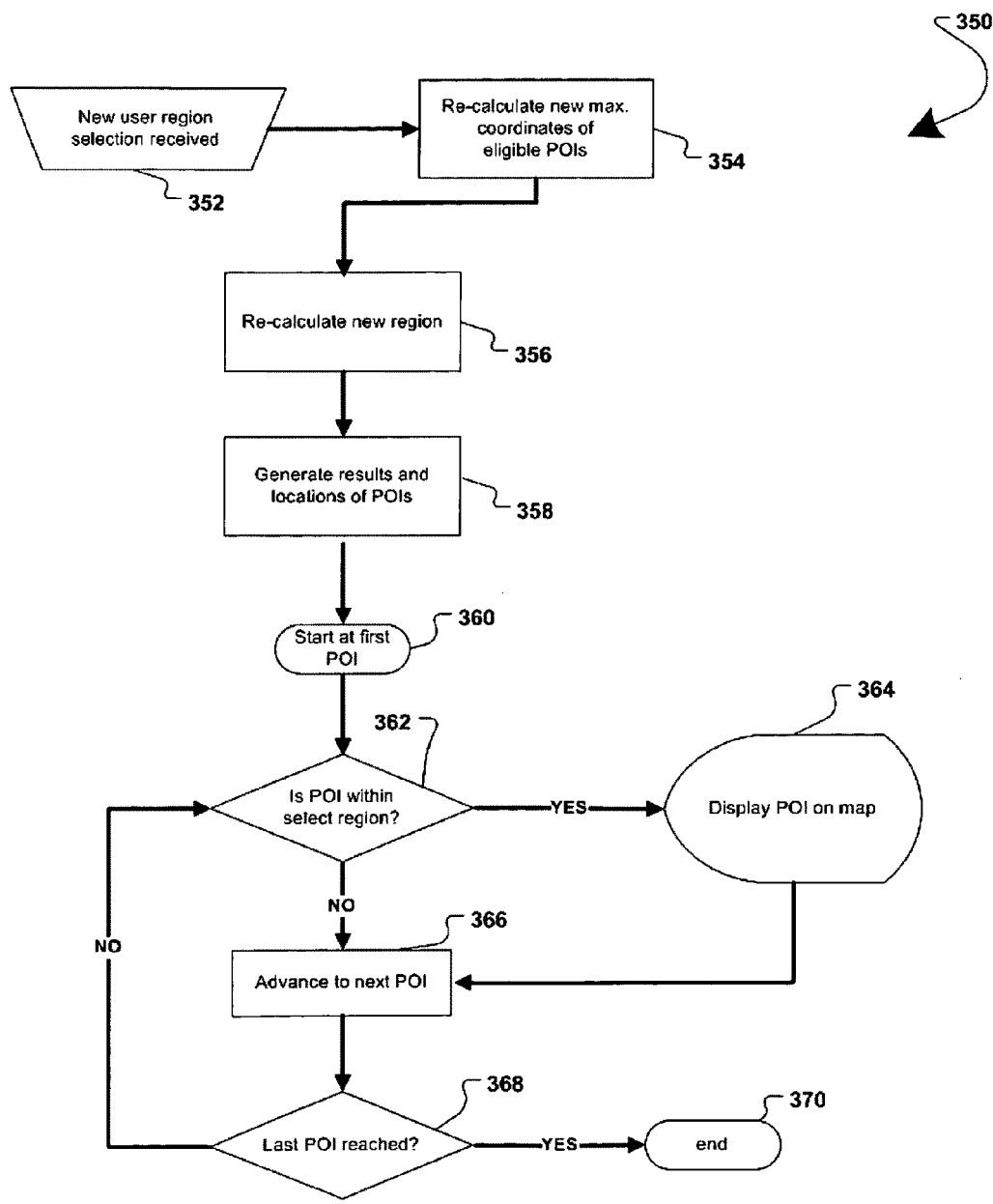

FIGS. 3A & 3B are generalized flow diagrams illustrating retrieving and displaying POIs in a new region of a digital map, the new region selected by a user, according to various embodiments of the present invention.

Referring to FIG. 3A, flow diagram 300 illustrates one possible embodiment where a user's selection of a region is received at step 301. For example, the user may touch the screen of an electronic device, highlighting an area of an electronic map, thereby selecting the region.

At step 302, the user may enter a search query in order to generate POIs on a map. POIs are typically generated in response to a user's search query or selection of criteria, such as "gas stations" or "coffee shops, San Francisco."

At step 304, the search query from step 302 may be received and at step 306, a result-set of POIs may be generated/retrieved. For example, a mapping application may pass the user's search query to a server/service associated with a data store of POIs, where the query may be processed and POIs fitting the query criteria and geographic coordinates of the map, may be generated and returned to the mapping application.

At steps 308-318, the POIs in the result-set may be recursed and any POI fitting within the confines of a selected region, may be displayed. At step 308, the first POI in the result-set may be retrieved. At step 310 it may be determined whether the geographic location of the present POI is within the confines of the region selected at step 301.

If at step 310 it is determined that the present POI is within the confines, at step 312 the POI may be displayed at the corresponding geographic location (e.g. as an icon or pushpin) on the digital map.

At step 314, the next POI in the result-set may be examined, and the steps 310-314 may be repeated, until at step 316 it is determined that the last POI in the result-set has been reached, in which case at step 318, the process of displaying POIs on the selected region ends.

Please note that the steps 301-306 are interchangeable and can be performed in a different order; for example, the user may input a search query prior to selecting a region of a map. The order of the steps in the flow diagram 300 illustrates one of many ways to implement the present invention.

Referring now to FIG. 3B, in flow diagram 350, at step 352 a user selects a new region (e.g. by selecting a new, secondary region to be added to the first region; or, by selecting a new region on the digital map non-contiguous with the first region; or by deleting a portion of the first region; or by panning or zooming the map, etc.)

At step 354, the maximum coordinates of a the newly-selected region may be calculated. As shown in FIG. 4B, in a preferred embodiment, it may be beneficial to calculate a rectangular region containing the entire polygonal newly-selected region to generate an approximated POI result-set fitting the newly-selected region, at step 358.

For example, an internet-based data store containing POIs may be queried and all POIs fitting a search criteria and within the geographic bounds of the rectangular region enveloping the newly-selected region, may be returned.

At steps 360-368, the POIs in the result-set may be re-cursed and any POI fitting within the confines of a newly-selected region, may be displayed. At step 360, the first POI in the result-set may be retrieved. At step 362 it may be determined whether the geographic location of the present POI is within the confines of the newly-selected region defined at step 352.

If at step 362 it is determined that the present POI is within the confines of the newly-selected region, at step 364 the POI may be displayed at the corresponding geographic location (e.g. as an icon or pushpin) on the digital map.

At step 366, the next POI in the result-set may be retrieved, and the steps 362-368 may be repeated, until at step 368 it is determined that the last POI in the result-set has been reached, in which case at step 370, the process of displaying POIs on the selected region ends.

Please note that the steps 352-358 are interchangeable and can be performed in a different order; for example, the user may input a search query prior to selecting a region of a map. The order of the steps in flow diagram 350 is illustrative of one of many ways to implement the present invention.

Figure 4A:
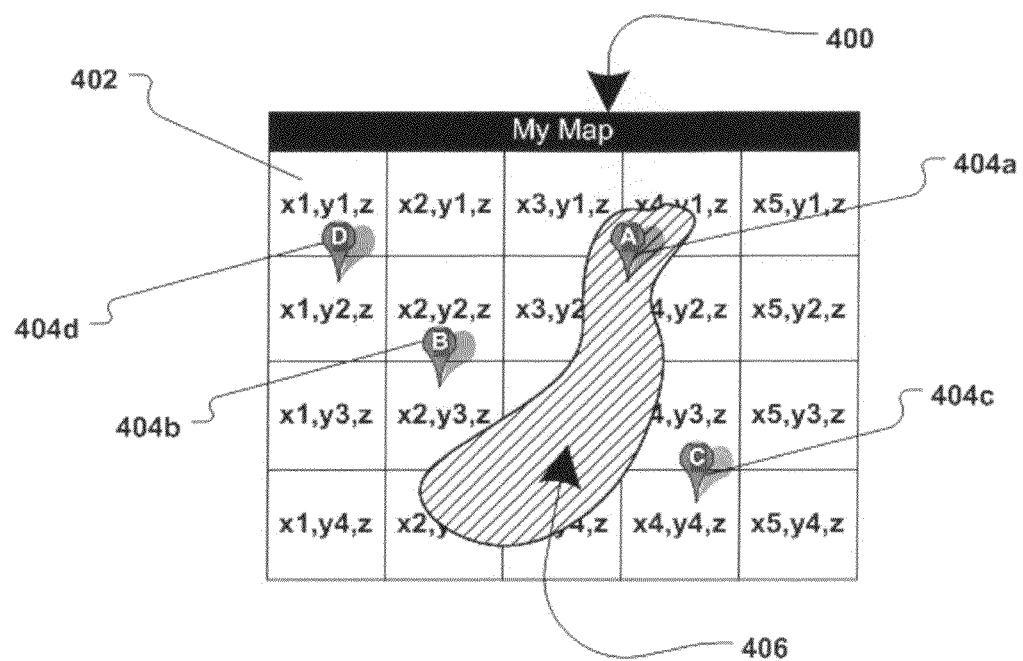
FIGS. 4A, 4B and 4C demonstrate retrieval and display of POIs within the confines of a user-selected region of a digital map displayed on an electronic device.
Figure 4B:
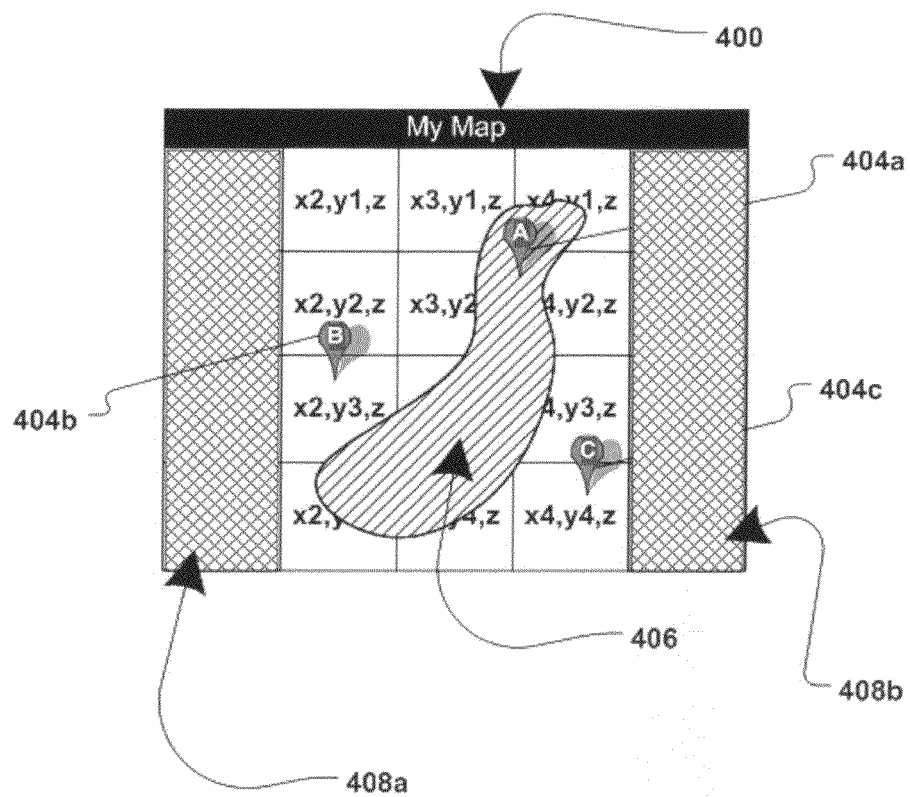
Figure 4C:
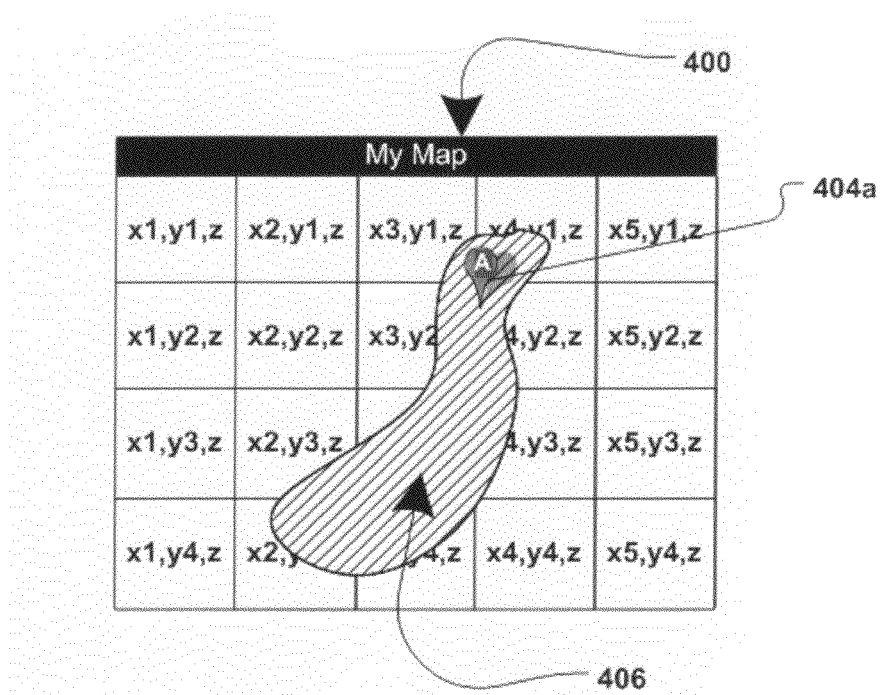

FIGS. 4A, 4B and 4C demonstrate retrieval and display of POIs within the confines of a user-selected region 406, of a digital map 400 displayed on an electronic device, according to one preferred embodiment of the present invention.

Referring to FIG. 4A, a digital map 400 may be comprised of map tiles, for example map tile 402 representing an area x1,y1 at zoom level z. In the prior art, POIs "A" 404a-"D" 404d for the entire digital map 400 are retrieved and may be displayed.

The POIs "A" 404a, "B" 404b, "C" 404c and "D" 404d are theoretically available for the map 400, comprising map tiles (x1,y1,z)-(x5,y4,z); however, according to the present invention, these POIs are not displayed on the digital map 400.

Referring now to FIG. 4B, one of the efficiencies in the present invention is realized in retrieving of POIs only within a tight grid surrounding the selected region 406. The selected region 406 is a complex polygon whose shape and area may be costly to transmit back to the mapping server, in order to match POIs strictly within the area of the selected region 406. It maybe therefore beneficial to transmit a rectangular area, comprising map tiles (x2,y1,z)-(x4,y4,z) and encapsulating the entire selected region 406, to the mapping server. Map tiles (x1,y1,z)-(x1,y4,z) 408a and (x5,y1,z)-(x5,y4,z) 408b may be discarded, i.e. not transmitted to the mapping server for the purpose of retrieving POIs in those areas.

In this example, the mapping server may return the POIs "A" 404a, "B" 404b and "C" 404c as they are all within the area of the map tiles (x2,y1,z)-(x4,y4,z).

Referring now to FIG. 4C, the mapping application may now process the smaller subset of POIs ("A" 404a, "B" 404b and "C" 404c in FIG. 4B) as opposed to the larger set ("A" 404a, "B" 404b and "C" 404c, "D" 404d in FIG. 4A) and display only the POIs within the selected region 406. In this example, the POI "A" 404a may be displayed as it is the only one of the POIs that is within the selected region 406.

In other possible embodiments, various other methods may be used to identify POIs within the user-selected region 406, retrieve the POIs' information and display the POIs.

Figure 5A:
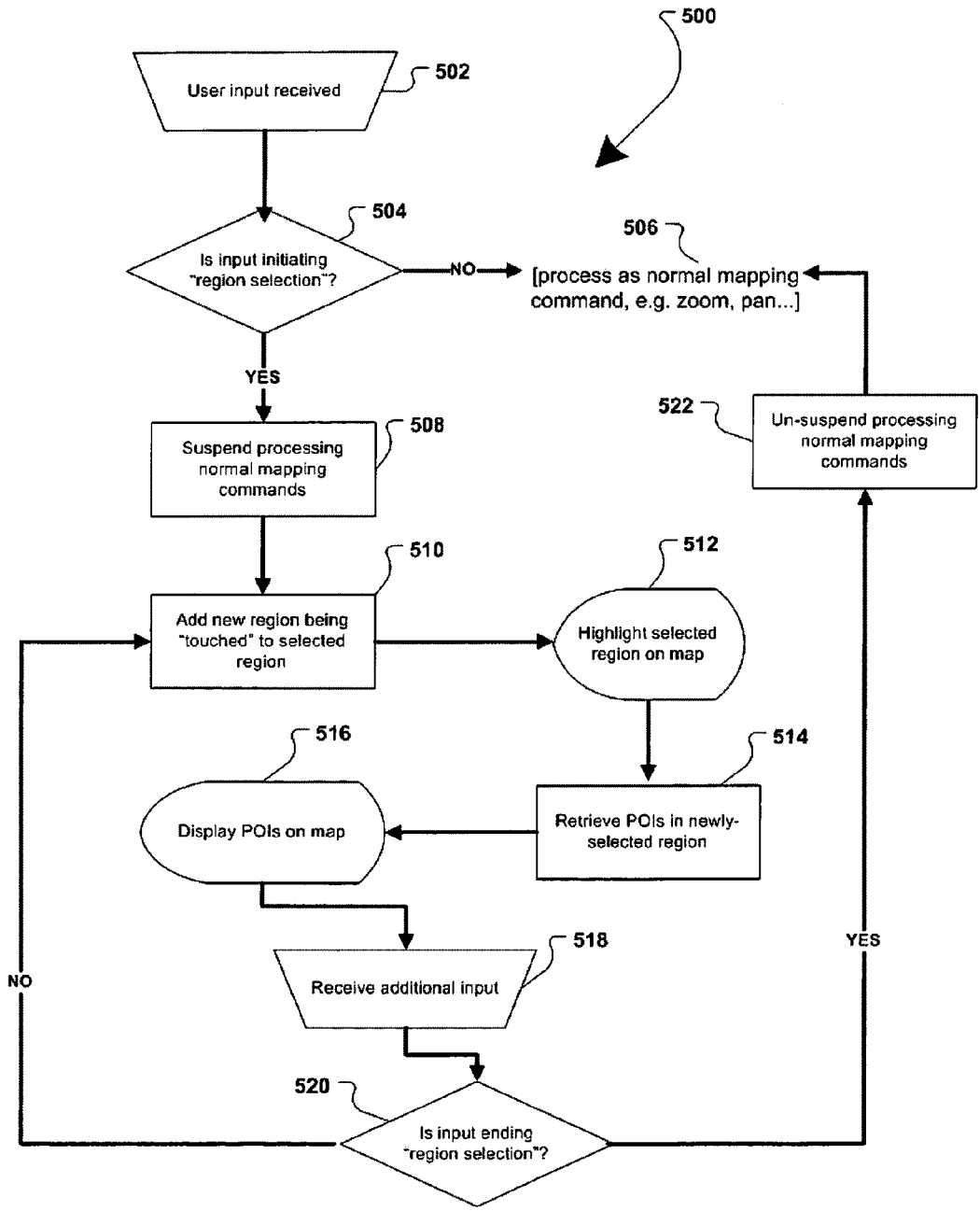
FIGS. 5A and 5B are generalized flow diagrams illustrating receiving and processing user's region selection commands, according to various embodiments of the present invention.
Figure 5B:
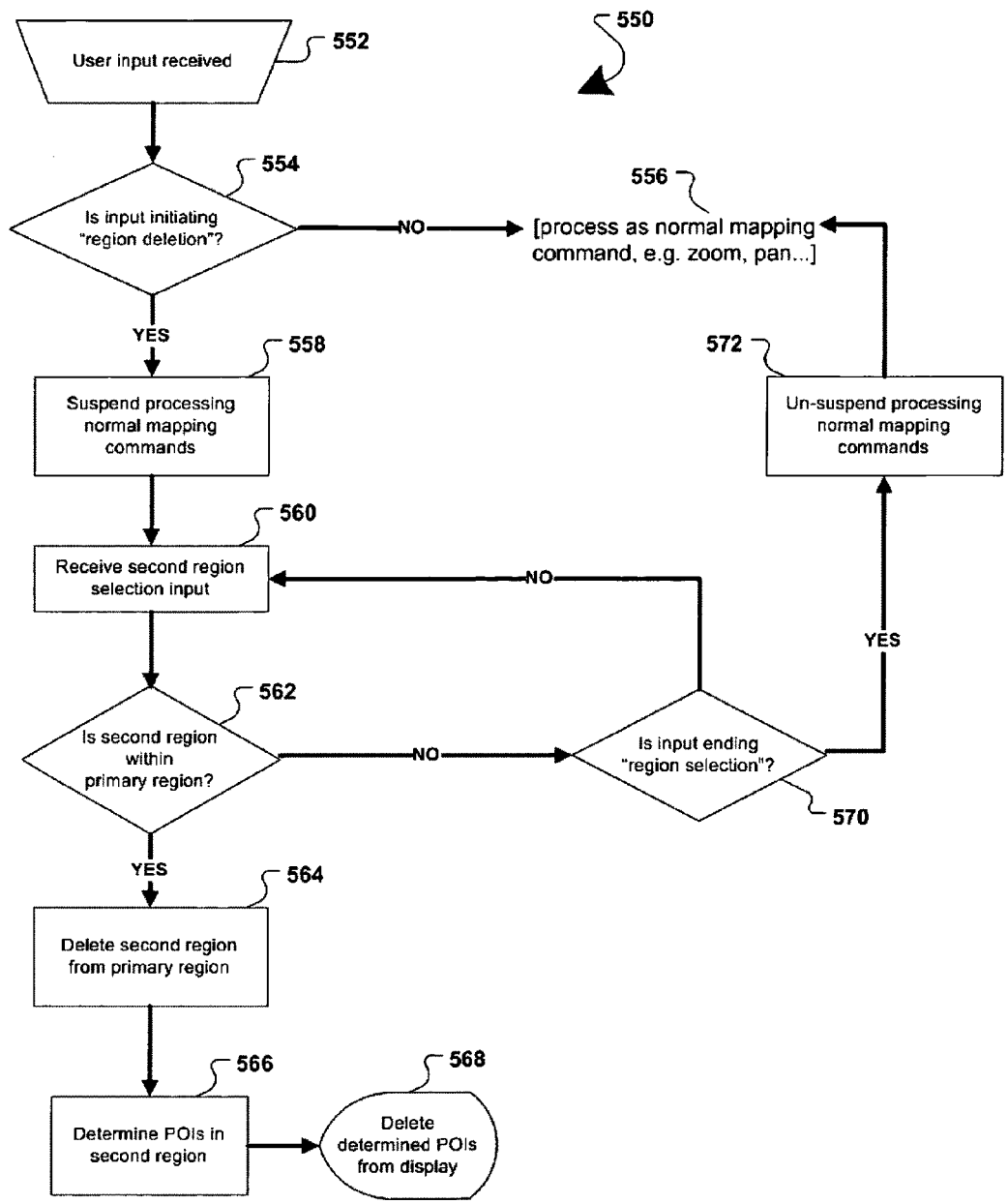

FIGS. 5A and 5B are generalized flow diagrams illustrating receiving and processing user's region selection commands, according to various embodiments of the present invention. A user may select a region on a hand-held device via a touch-screen. For example, the user may slide his/her finger across the device's screen, thereby highlighting portions of the digital map.

Another challenge the present invention overcomes is differentiating between user instructions to select a region and user instructions used commonly to perform mapping operations/manipulations. For example, in many handheld devices, placing a finger on the right side of the screen and sliding it to the left causes the displayed digital map to pan to the left. The flow diagram 500 in FIG. 5 illustrates one embodiment of the present invention overcoming that challenge.

At step 502, user input is received. For example, touch input via the touch-screen interface of the electronic device. At step 504, a determination is made whether the user input includes an instruction to start a "region selection" (i.e. any further input by the user is to be interpreted as input selecting a region rather than manipulating the map.) For example, the user may click an icon displayed on or near the electronic map, indicating that the user wishes to select a region.

If it is determined at step 504 that the user's input was not intended to initiate the selection of a region, at step 506 the user input is interpreted as regular input outside the scope of the present invention by the mapping application. (e.g. the user input may be interpreted as an instruction to zoom out.)

If at step 506 it is determined that the user input was intended to initiate the region selection, at step 508 all further user inputs are set to be interpreted as region selection input (e.g. highlighting the digital map selecting a region.) For example, the user's sliding their finger to the right may now be interpreted as a request to highlight/select a region to the right—as opposed to the convention interpretation of a request to pan the map to the right.

At step 510, the area of the screen "touched" as part of the input is interpreted as an additional region to highlight on the digital map, and at step 512 the selected additional region may be highlighted on the map. Alternatively, the selected additional region may be delimited some other way by the mapping application.

At step 514, the newly-selected-and-highlighted region may be processed by the mapping service to retrieve any applicable POIs in that region. For example, if the new region newly-selected-and-highlighted by the user represents a city block on the digital map, POI(s) in that city block are retrieved, and at step 516, the POI(s) may be displayed on the digital map (i.e. on top of the newly-selected-and-highlighted.)

At step 518, additional user input may be received. If it is determined at step 520 that the additional user input was designated as input to end region selection (e.g. the user has clicked/touched an icon labeled "end selection"), at step 522 regular mapping-commands processing may be resumed, i.e. at step 506 any further user input will continue being interpreted as mapping commands (e.g. pan map, zoom, etc.)

If at step 520 it is determined the input at step 518 was not intended to stop the region selection, at steps 510-516 the process of adding new regions to the selected region, and retrieving and displaying associated POIs, continues.

Referring now to FIG. 5B, the flow described in flow diagram 550 is another possible embodiment of allowing a user to select a secondary region to subtract from a primary region. The primary region may be defined as a region already selected on a map and in which POIs are displayed. The user may use different types of commands to start and stop the secondary region selection.

POIs may be retrieved and displayed at the end of the secondary region selection, according to one possible embodiment; or, in another possible embodiment, POIs may be updated interactively as the user updates his/her selection of the secondary region.

At step 552, user input may be received. At step 554, a determination may be made as to whether the input represents a "region deletion request", i.e. a request to commence the selection of a secondary region to subtract from the primary region. For example, the user may select a designated button (or graphical representation on the screen) to cause the mapping application to interpret future input as input for selecting a secondary region to delete from the primary region—as opposed to input intended to perform normal mapping operations such as zoom and pan.)

If it is determined at step 554 that the user input was not a request to select a secondary region to remove from the primary region, at step 556 the user input may be processed as ordinary mapping commands (e.g. zoom, pan, select a POI, etc.)

If it is determined at step 554 that the user input was a request to select a secondary region to remove from the primary region, at step 558 all further input to the mapping application may treated as input for the secondary region selection. For example, further input comprising the user's swiping his/her finger across a screen where the map is displayed may be interpreted as a command to delete the area under the finger swipe, as opposed to the ordinary interpretation of the swipe as a command to pan the map.

At step 560, user input may be received selecting area of the secondary region. At step 562 it may be determined whether the area selected as the secondary region at step 560 is within the area of the primary region. For example, if the primary region includes San Francisco, and the user input at step 560 includes highlighting Fisherman's Wharf in San Francisco, then at step 562 it is determined that the secondary region is within the primary region.

If it is determined at step 562 that the secondary region is within the primary region, at step 564 the area represented by the secondary region may be deleted from the primary region. In the example above, the city of San Francisco may be highlighted with the area of Fisherman's Wharf being de-highlighted to denote the area has been deleted by the users from the primary region (i.e. POIs will display throughout San Francisco excluding Fisherman's Wharf.)

At step 566 POIs that are within the secondary region may be determined and at step 568, the determined POIs may be removed from the display. As per the example above, if the area of the map previously containing POIs (i.e. the primary region) is the city of San Francisco and the secondary region (i.e. area marked by user as portion of the primary region to be deleted) is Fisherman's Wharf, then at step 568 all POIs representing locations at Fisherman's Wharf may be deleted from the display.

If at step 562 it is determined that the user's selected area (i.e. the secondary region) is not within the primary region, then at step 570 it may be determined whether the user input—presumably selecting the secondary region—was rather input indicating the ending of the "region selection" process, first initiated at step 554. For example, the user's tap on the screen may indicate ending the deletion routine and returning to normal mapping operations (where "tapping" means selecting a location, for example)

If at step 570 it is determined that the user input indicted terminating the region selection/deletion process, at step 572 processing map commands normally may be resumed (i.e. un-suspending processing normal mapping commands, the suspending of processing normal mapping commands invoked at step 558).

FIGS. 6A-6F are generalized block diagrams illustrating a mapping application on a hand-held device functioning in accordance with various teachings of the present invention, in numerous preferred embodiments. The handheld device illustrated in this example includes a touch screen, allowing a user to input commands to the mapping application running on the handheld device by touching the touch screen. In other possible embodiments, the user may use other means of inputting instructions to the mapping application on the handheld device.

Figure 6A:
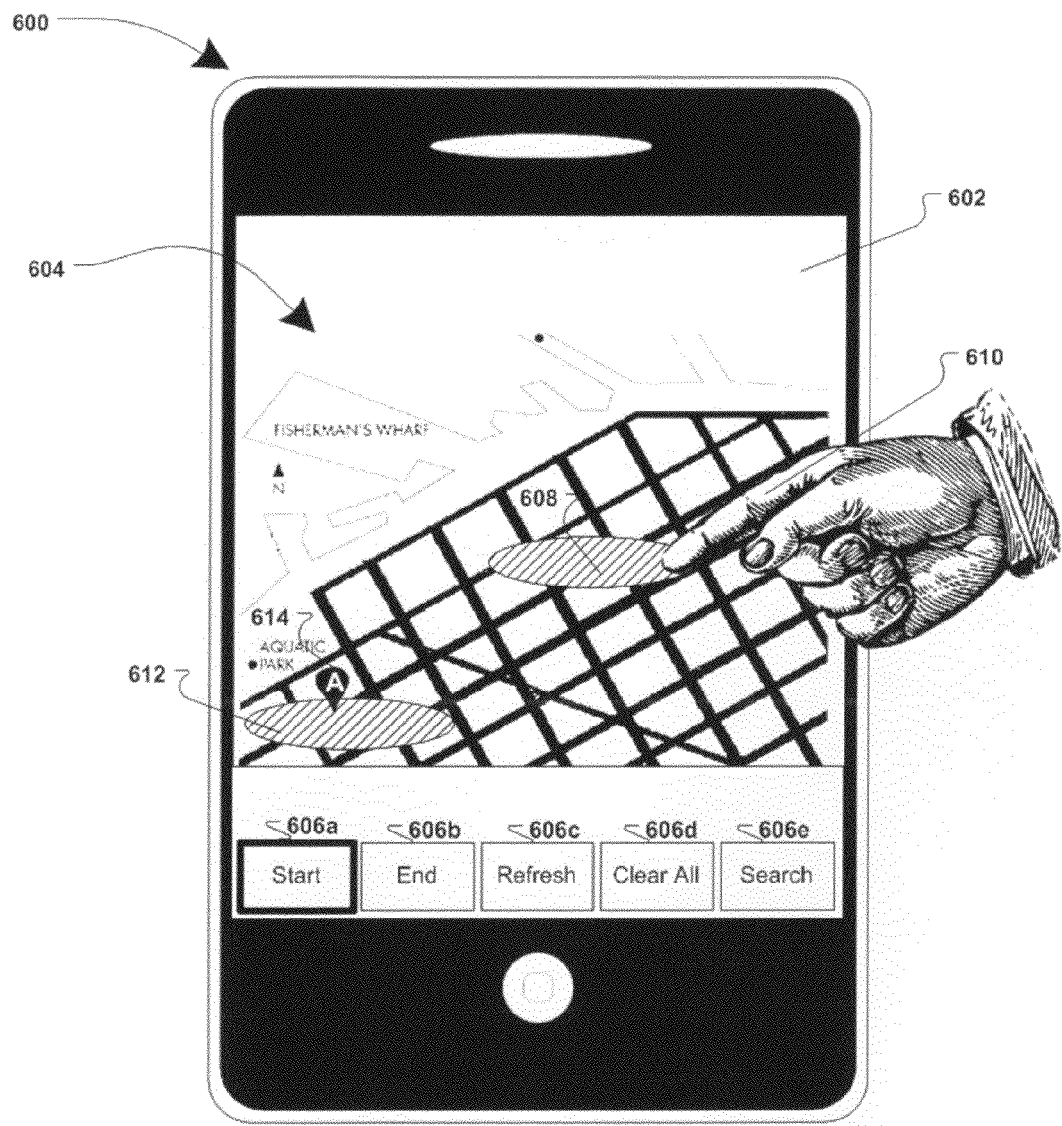
FIGS. 6A-6F are generalized block diagrams illustrating a mapping application on a hand-held device functioning in accordance with various teachings of the present invention, in numerous preferred embodiments.

Referring to FIG. 6A, a handheld device 600 may include a display 602 displaying a digital map 604. The digital map 604 may include one or more selected regions. For example, one selected region 612 may be highlighted (note that the one selected region 612 is shown here "crosshatched" as an illustration only—in a real life implementation, the region 612 may be delimited in various ways, for example via a perimeter line in any graphical way, without deviating from the teachings of the present invention.)

Numerous graphical user interface ("GUI") controls 606a-606e may be displayed, allowing the user to define/select new regions and display POI graphics in those regions. For example, a button may be labeled "Start" 606a and may allow a user to toggle between a regular mapping mode (i.e. the mapping application responds to user touch commands by performing common zoom/pan functions) and responding to user touch commands by performing functions specific to this invention (e.g. selecting regions on the digital map.)

In this example, the user may slide his/her finger 610 across the screen 602, for example left-to-right. In normal mapping mode, such sliding action may cause the digital map 604 to pan to the right, following the direction of the finger 610 (or any other pointing device thereof). However, in the presently discussed embodiment of this invention, with the user having selected the "start" 606a button, the sliding of the finger 610 to the right may cause a new region 608 to be defined (and delineated, i.e. drawn) on the digital map 604. The size and shape of the new region 608 may approximately correspond with the movement of the finger/pointing device 610.

The new region 608 may display POIs immediately; or in alternate embodiments, following further user action such as the user's selection of the button "refresh" 606d (see discussion of FIG. 6C below). The new region 608 may be added to one or more other existing regions 612, and may not have to be contiguous with the one or more other existing regions 612.

Figure 6B:
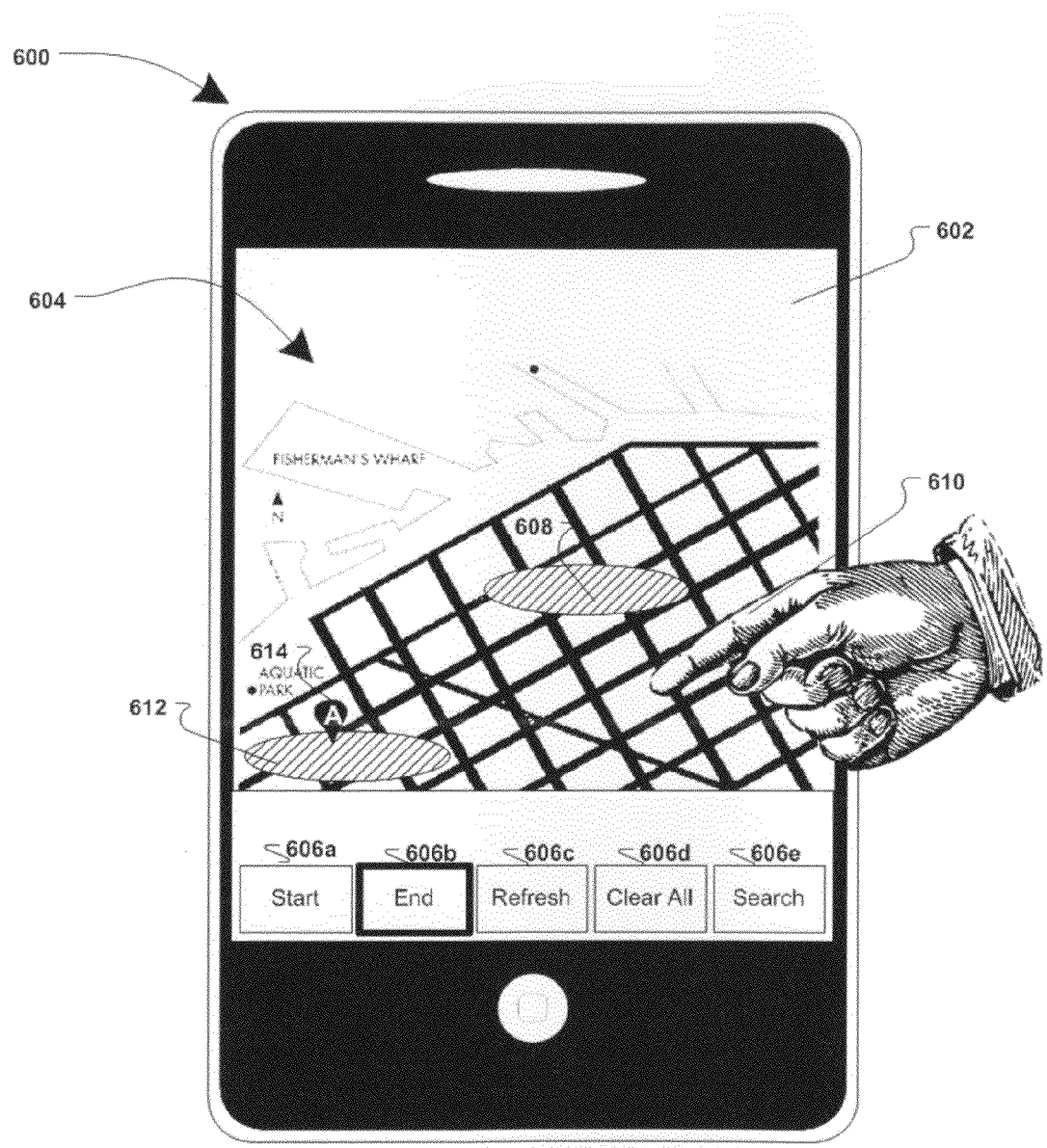

Referring now to FIG. 6B, the user may select an "end" button/control 606b to end the processing of the user's inputs as region selection inputs—per the teachings of the present invention—and resume the processing of the inputs as common mapping commands. For example, the user, having selected the "end" button 606b, may now touch the screen 602 with his/her finger 610 (or any other input device) and that touching input may no longer be interpreted as input directed at region selection, but rather as ordinary mapping commands input. In this example, the user's touching the screen 602 and sliding his/her finger across may no longer affect the new selected region 608.

Figure 6C:
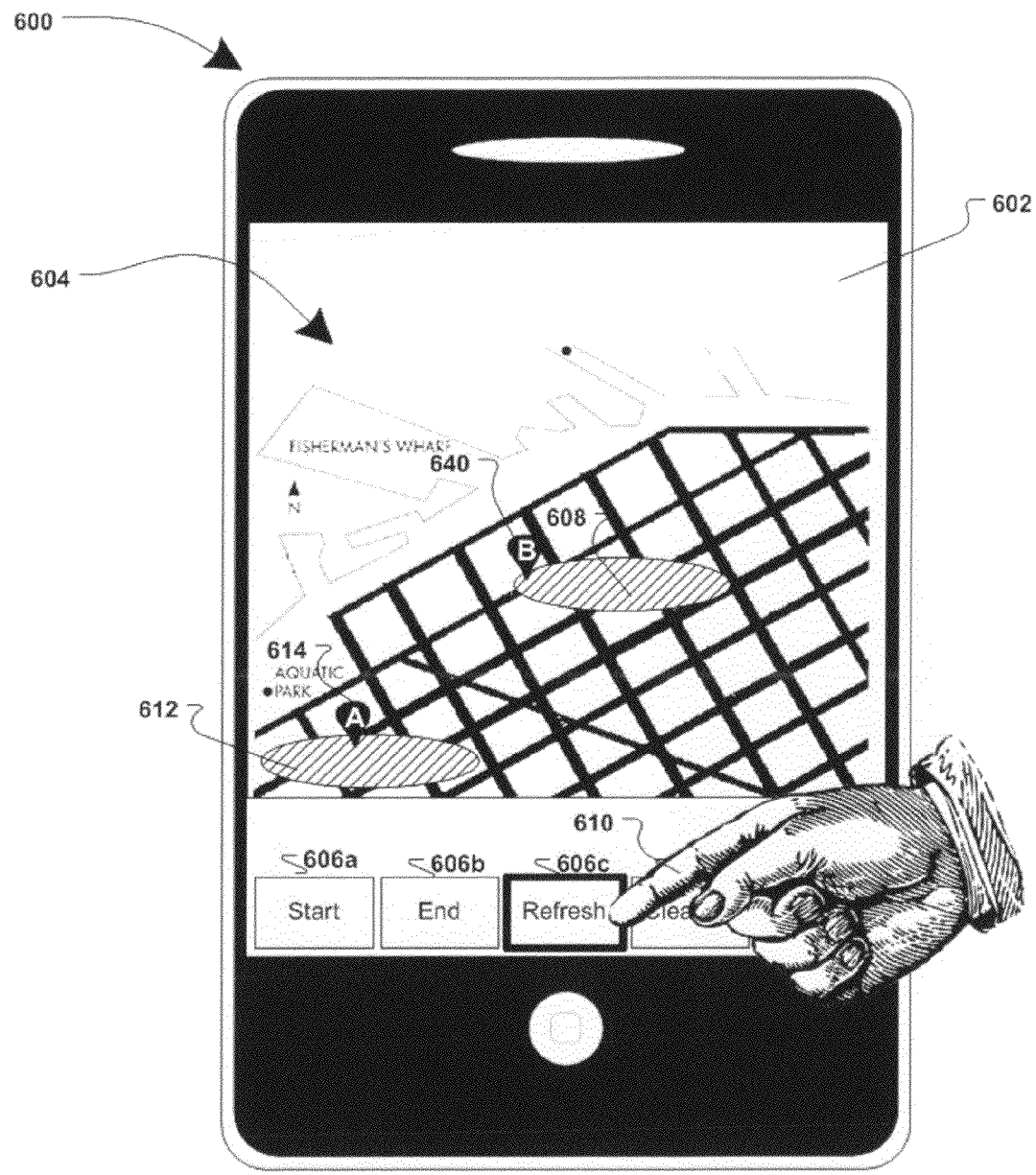

Referring now to FIG. 6C, a "refresh" button 606c may cause retrieval and display of POIs whose coordinates are within one or more selected regions. For example, after the user had selected the new region 608 in FIG. 6A, in FIG. 6C the user's selection of the "refresh" button 606c may cause the display of a graphic "B" 640 representing a new POI within the new region 608.

As discussed earlier, in one embodiment of the present invention, POIs may be retrieved and displayed interactively:

i.e., as the user slides his/her finger across the screen defining a new region, the coordinates of the region may be automatically relayed, in close-to-real-time, to a mapping server, causing the retrieval and display of new POIs. In an alternate embodiment, illustrated in this example, the POIs may be retrieved and displayed in response to a user's command.

This algorithm may be particularly useful in conserving computing cycles and bandwidth, as the tasks of measuring the coordinates of the newly-selected region, transmitting the coordinates to a mapping server to query a data store and retrieve POIs within the coordinates, transmitting the POIs back to the client's device and displaying the POIs—all consume computing cycles and bandwidth. Thus it may be beneficial, in some embodiments, to not retrieve and display POIs pertinent to the newly-selected region 608 until the user has explicitly requested to do so, for example by selecting the command button "refresh" 606c.

Figure 6D:
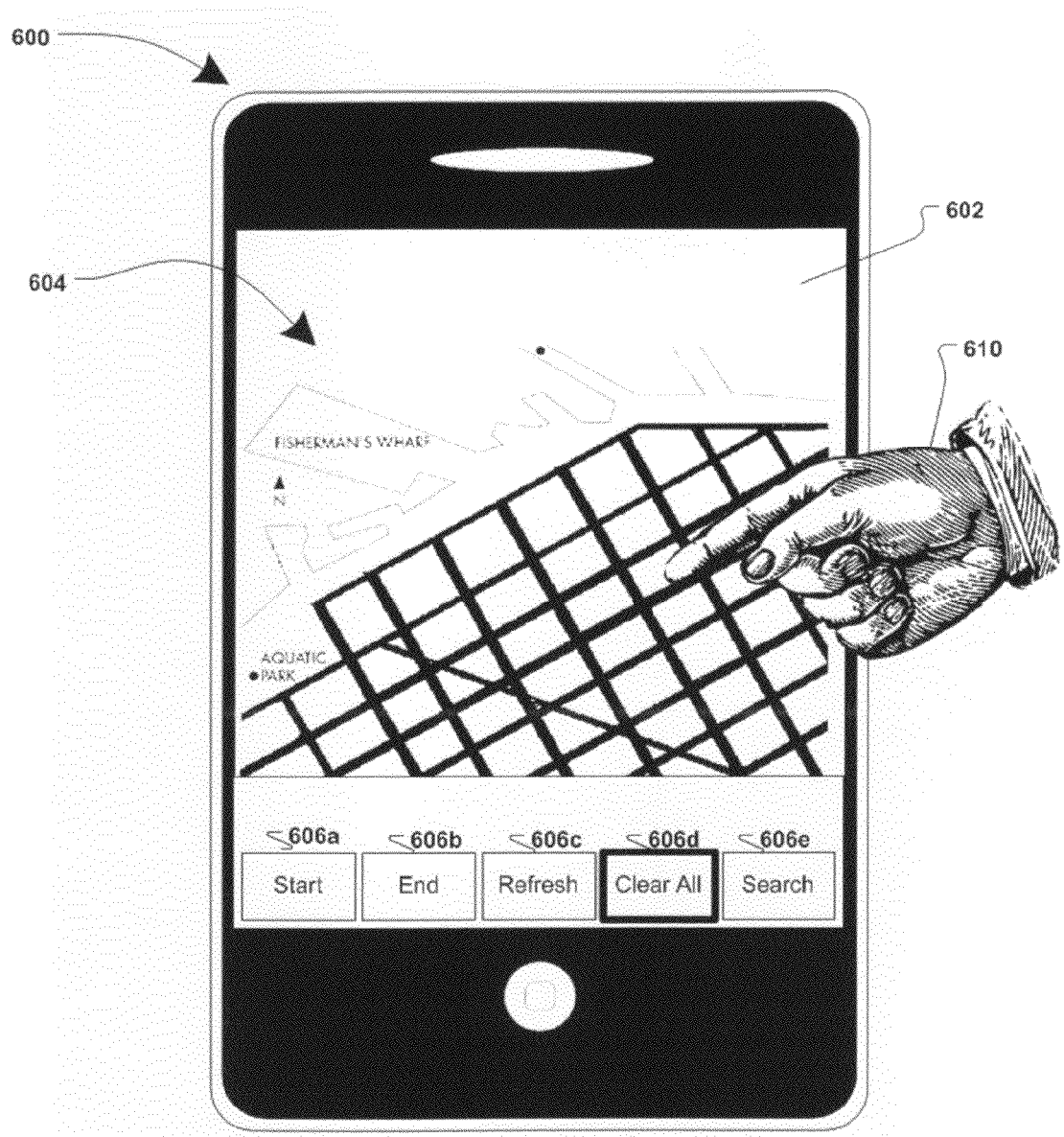

Referring now to FIG. 6D, it may be useful to provide the user with the ability to erase/de-select previously-selected regions from the digital map. For example, in a case where the user has made a mistake and wished to select a new region instead of the previously-selected region. A button/GUI-interface "Clear All" 606d may be presented and the user may select the button to erase from the digital map 604 all the previously-selected regions 608 and 612 (see FIG. 6C).

In various possible embodiments the deletion of the previously-selected regions may take places in various ways: the user may be prompted for okay, the previously-selected regions may be deleted one region at the time, all POI graphics within the previously-selected regions may be deleted as well; search queries may be reset, etc.

Figure 6E:
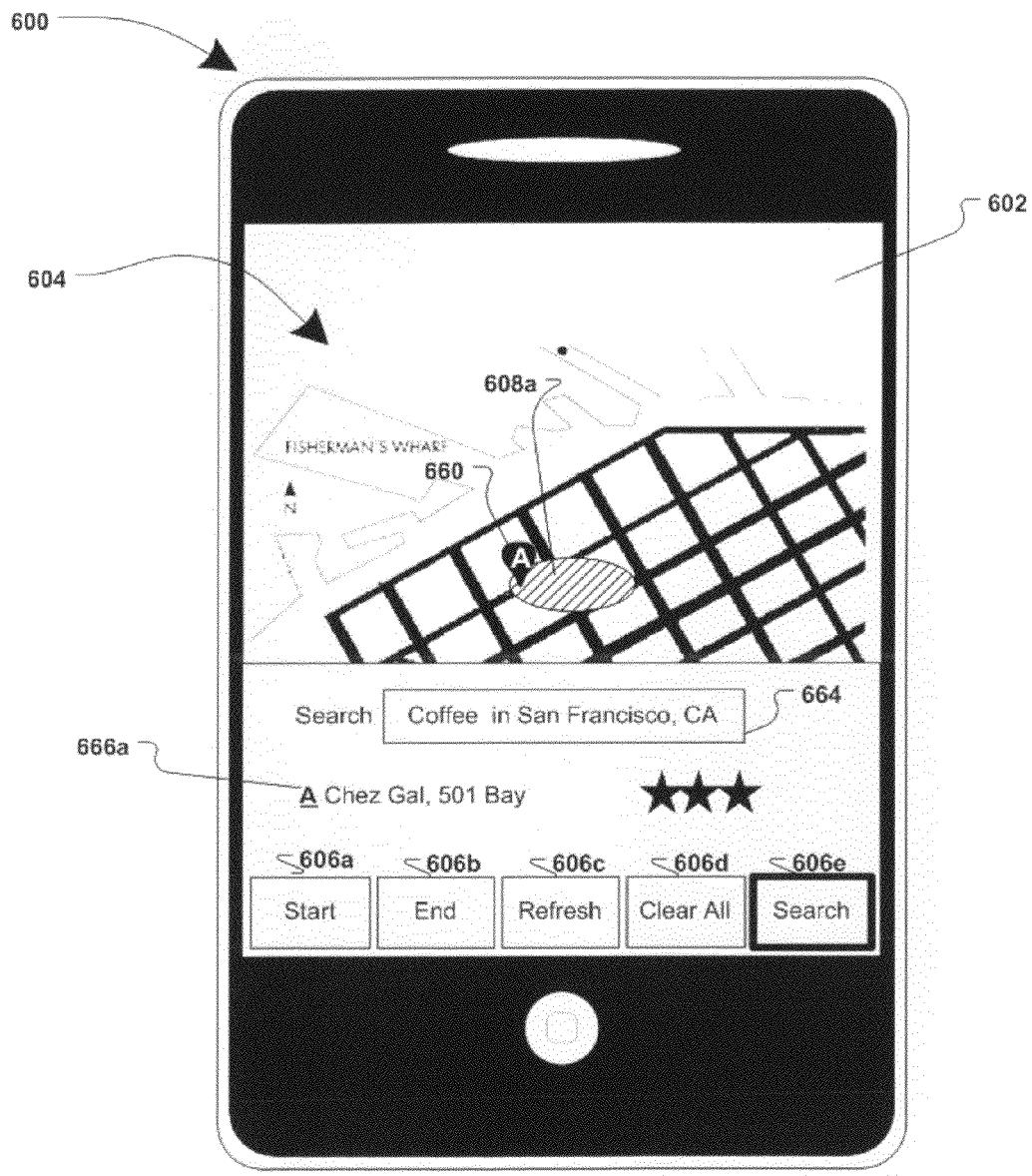

Referring now to FIG. 6E, an embodiment coupling the present invention with a search feature is illustrated. In the prior art, the user is able to enter a search query 664 (i.e. criteria), as example "Coffee in San Francisco", and in response, receive a listing 666a of one or more POIs (e.g. businesses) matching the search criteria.

The returned one or more POIs may be confined to the selected region 608a, i.e. the mapping application may discard any POI whose location is not within the confines of the selected region 608a. POIs that are within the confines of the selected region 608a, such as "A" 660, may be displayed on the digital map 604.

In another possible embodiment, the returned list 666a of POIs and/or the POIs graphics 660 displayed on the digital map 604 within the selected region 608a, may be dynamically (i.e. automatically and in near-real-time) updated in response to the user's altering the selected region 608a (i.e. adding to it/deleting from it, etc.)

Figure 6F:
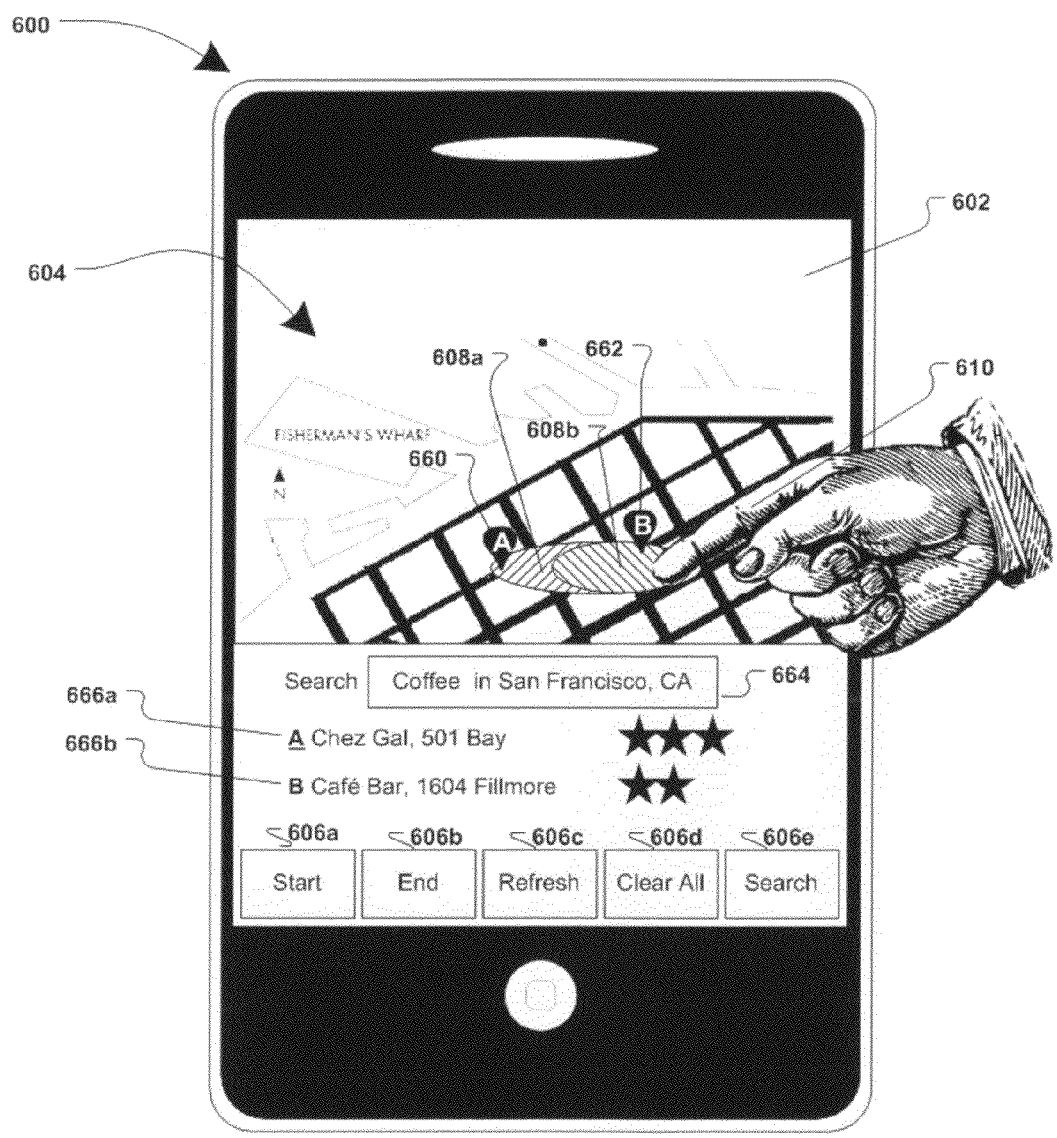

For example, referring now to FIG. 6F, the user may modify the selected region 608a by selecting (e.g. with his/her finger 610 or pointing device) a new region 608b. In response to receiving new user input selecting the new region 608b, the mapping application may automatically update the list of search results (e.g. by re-running the search query 664 against the mapping server or an internal data store, using the new coordinates of the previously-selected and newly-selected regions) and display an updated list 666b of POIs. The updated list of POIs may include new POIs that are within the confines of the new region 608b. Graphics representing the new POIs 662 may then be displayed on the digital map 604 within the confines of the new region 608b.

Additionally, in a similar embodiment, the returned list of POIs may be updated in response to a user's deleting a portion of the selected region (in which case one or more of the previously-listed POIs may be omitted from the revised list of POIs following the reduction in the size of the selected region).

Figure 7A:
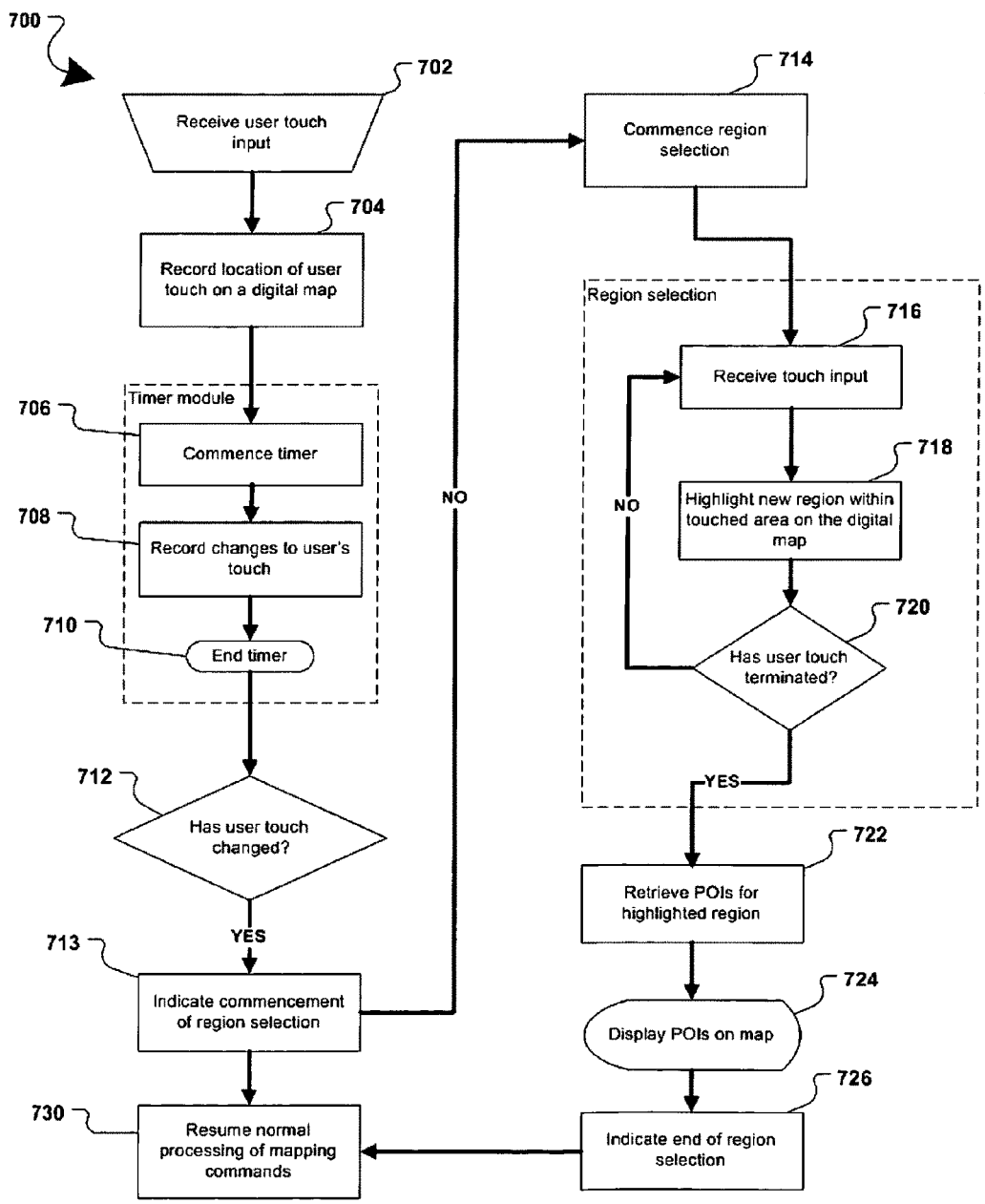
FIGS. 7A and 7B are generalized flow diagrams illustrating an alternate method of allowing a user to select an arbitrary region via touch, and display POIs on the selected region, in other embodiments of the present invention.
Figure 7B:
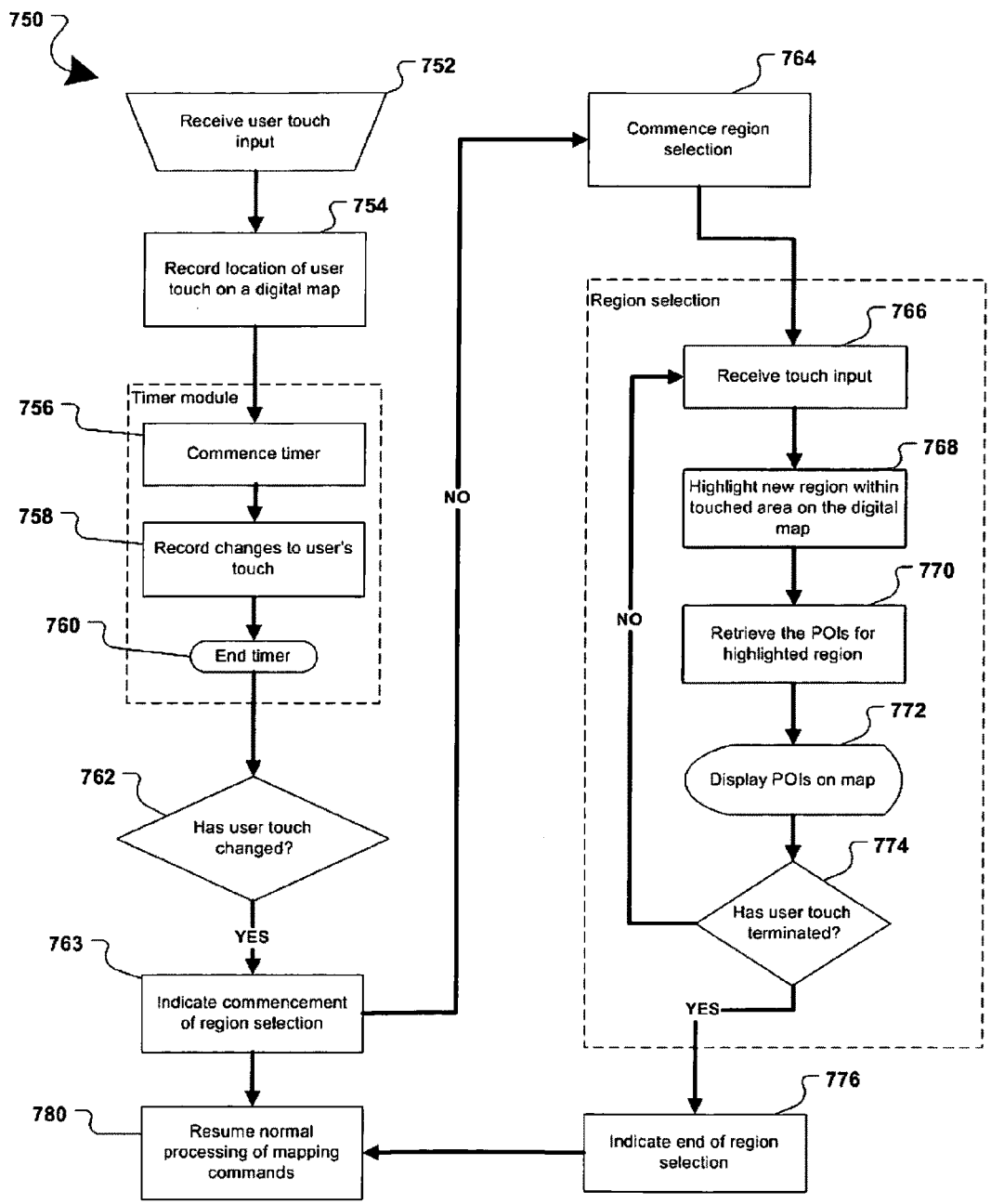

FIGS. 7A and 7B are generalized flow diagrams illustrating an alternate method of allowing a user to select an arbitrary region via touch, and display POIs on the selected region, in other embodiments of the present invention. While previously-disclosed embodiments teach a button/graphical control that allows the user to switch between interpreting user input as mapping commands, and user input as region-selection commands, the present embodiment teaches allowing a user to touch-and-hold the screen to start and stop the region selection.

Referring to FIG. 7A, flow diagram 700 illustrates one embodiment where the user does not use a special control to select the region and display one or more POIs on the selected region. Rather, the user uses screen-touching sequences to perform the region selection functions. The user may press-and-hold-down a spot on a screen of an electronic device to indicate to a mapping application displaying the digital map, that they are trying to initiate the selection of a region.

At step 702, user input is received. The user input is touch input, for example, the user touching the screen over a certain spot on the digital map. At step 704 the coordinates of the spot the user is touching on the screen are recorded.

At steps 706-710 a timer may be invoked to ascertain the persistence of the user's selection, via touch. At step 706 a timer may be started and at step 708 any change to the user's touch may be recorded. At step 710 the timing may end. The timer at steps 706-710 may be used to differentiate between the user's casual touching of the screen, and holding the screen at one spot for a number of seconds (e.g. timer may be set to 3 seconds) to indicate a "mode switch", processing consequential touch input as region-selection input, as opposed to common mapping input (e.g. map zoom/pan, etc.)

If at step 712 it is determined that the user touch had not changed (i.e. the user had been pressing the same spot on the screen persistently for a few seconds), at step 713 an indication may be displayed to notify the user the digital map is now in "region selection mode." (i.e. from that point on, future user touch input will be treated as commands to alter the selected region versus the common processing of such commands as mapping functions such as zoom and pan.) For example, a cursor displayed on the digital map may blink or may be represented by a different graphic; the digital map or portions of the cursor may change color; a sound may be played, etc.

At step 714 region selection may commence. Consequently, at steps 716-720 all user touch inputs may be interpreted as region-selection commands. At step 716 new user touch input may be received. At step 718 areas on the digital map affected by the touch input may be delimited (e.g. highlighted).

At step 720, it may be determined whether the user had terminated their touching the screen to indicate completion of the region selection process. For example, at steps 716-718 the user may outline a region on the digital map by gliding their finger along the screen; and when done, the user may lift their finger to indicate finishing selecting the region.

At step 722, POIs applicable to the selected region may be retrieved and at step 724, the POIs may be displayed at their respective geographic coordinates on the digital map.

At step 726, an indication may be presented to the user that the region-selection function has ended and hence forth, consequent touching/gliding along the screen would be treated as common mapping commands, such as panning. At step 730 processing of touch events as normal mapping commands may be resumed.

Referring now to FIG. 7B, flow diagram 750 illustrates a closely-related embodiment in which POIs are determined and displayed in real-time, in response to the user's gliding their finger along the screen of the electronic device.

At step 752, user input is received. The user input is touch input, for example, the user touching the screen over a certain spot on the digital map. At step 754 the coordinates of the spot the user is touching on the screen are recorded.

At steps 766-760 a timer may be invoked to ascertain the persistence of the user's selection, via touch. At step 756 a timer may be started and at step 758 any change to the user's touch may be recorded. At step 760 the timing may end. The timer at steps 756-760 may be used to differentiate between the user's casual touching of the screen, and holding the screen at one spot for a number of seconds (e.g. timer may be set to 3 seconds) to indicate a "mode switch", processing consequential touch input as region-selection input, as opposed to common mapping input (e.g. map zoom/pan, etc.)

If at step 762 it is determined that the user touch had not changed (i.e. the user had been pressing the same spot on the screen persistently for a few seconds), at step 763 an indication may be displayed to notify the user the digital map is now in "region selection mode." (i.e. user touch input will be treated as commands to alter the selected region vs. the common processing of such commands as mapping functions such as zoom and pan.) For example, a cursor displayed on the digital map may blink or may be represented by a different graphic; the digital map or portions of it may change color; a sound may be played, etc.

At step 764 region selection may commence. Consequently, at steps 766-774 all user touch inputs may be interpreted as region-selection commands and POIs may be added to the newly-selected region following the user's defining of the newly-selected region.

At step 766 new user touch input may be received. At step 768 areas on the digital map affected by the touch input may be delimited (e.g. highlighted).

At step 770, POIs whose coordinates are within the selected region may be retrieved and at step 772, the POIs may be displayed at their respective geographic coordinates on the digital map.

At step 774 it may be determined whether the user had terminated their touching the screen to indicate completion of the region selection process. For example, at steps 766-772 the user may outline a region on the digital map by gliding their finger along the screen; and when done, the user may lift their finger to indicate finishing selecting the region.

At step 776, an indication may be presented to the user that the region-selection function has ended and hence forth, consequent touching/gliding along the screen would be treated as common mapping commands, such as panning. At step 780 processing of touch events as normal mapping commands may be resumed.

While various embodiments of the present invention have been described in detail, it is apparent that further modifications and adaptations of the present invention will occur to those skilled in the art. However, it is to be expressly understood that such modifications and adaptations are within the spirit and scope of the present invention.

What is claimed is:

1. A method of displaying points-of-interest ("POI"s) on a digital map, comprising:
   displaying a digital map within a given view and at a given scale, on a graphical display of an electronic device;
   receiving user input containing a search query;
   providing one or more search results associated with the search query, the search results containing geographic coordinates;
   receiving user input defining a geographic region within the digital map, wherein the geographic region is defined from within the current view and current scale of the digital map, and wherein the geographic region is represented by a polygon;
   determining the one or more search results whose geographic coordinates are within the user defined geographic region; and
   displaying the determined one or more search results as one or more graphics on the digital map; wherein the one or more graphics represent one or more POIs.

2. The method of claim 1, wherein in response to receiving additional user input defining a secondary geographic region:
   determining a new set of one or more search results whose geographic coordinates are within the secondary geographic region; and
   displaying the new set of determined one or more search results as POIs on the digital map.

3. The method of claim 1, wherein the graphical display is capable of receiving user touch input.

4. The method of claim 3, wherein the user input selecting the geographic region is received via user touch.

5. The method of claim 1, wherein in response to receiving the user input defining the geographic region within the digital map, highlighting the defined geographic region.

6. The method of claim 1, wherein in response to receiving the user input defining the geographic region within the digital map, displaying a border outlining the defined geographic region.

7. The method of claim 1, wherein the geographic region corresponds to a route on the digital map.

8. The method of claim 7, wherein the geographic region is automatically set to include a route and a set amount of additional area adjacent to the route.

9. The method of claim 8, wherein in response to a change in the route on the digital map, the geographic region is updated to include a changed route.

10. The method of claim 9, wherein the change in the route is invoked by additional input from the user.

11. A method of displaying points-of-interest ("POI"s) on a digital map, comprising:
   displaying a digital map on a graphical display of an electronic device;
   receiving a first user input requesting suspending future processing of map control commands in subsequent user input;
   suspending the future processing of the map control commands;
   receiving a second set of user input, wherein the second set of user input defines a polygonal area within a presently displayed portion of the digital map;
   demarcating a region of the presently displayed portion of the digital map approximately matching the polygonal area defined by the second set of user input;
   computing a mathematical representation of the demarcated region, wherein the mathematical representation is based on longitude and latitude coordinates;
   receiving a third user input requesting un-suspending the future processing of the map control commands in subsequent user input;
   un-suspending the future processing of the map control commands;

presenting a set of POIs, wherein each POI is represented by longitude and latitude coordinates;

determining from the set of POIs a further subset of POIs, wherein the longitude and latitude coordinates of each of the POIs within the further subset of POIs is determined to be within the computed mathematical representation of the demarcated region; and displaying the subset of POIs on the digital map.

12. The method of claim 11, wherein the map control commands include zooming and panning.

13. The method of claim 11, wherein at least one of the first or the second or the third user inputs are touch-based.

14. The method of claim 11, wherein a visual indication is displayed to the user indicating a state of operation of the digital map as suspending or un-suspending the future map control commands.

15. The method of claim 11, wherein a "select" control is displayed in association with the digital map.

16. The method of claim 15, wherein in response to a first selection of the "select" control, the second user input is received.

17. The method of claim 16, wherein in response to a secondary selection of the "select" control, the third user input is received.

18. The method of claim 11, wherein a "clear" control is displayed in association with the digital map.

19. The method of claim 18, wherein in response to a selection of the "clear" control, all data received from the second set of user input is discarded.

20. The method of claim 19, wherein in response to discarding all the data received from the second set of user input, all POIs displayed on the digital map in response to the second set of data, are deleted from the digital map.

21. The method of claim 11 further comprising:
receiving the first user input via a first touch;
while the first touch persists, treating all successive user touch input as the second set of input; and
when the first touch terminates, treating the first touch termination as the third set of user input.

22. A method of displaying one or more points-of-interest ("POI"s) on a digital map, in conjunction with a free-hand, arbitrary, user-selected geographic region, comprising:
presenting a digital map on a graphical display of an electronic device, wherein the digital map comprises map tiles and corresponds to a geographic region;
receiving free-hand user input selecting a portion of the digital map;
delimiting the portion of the digital map selected by the user;
determining geographic bounds of the portion of the digital map selected by the user;
determining geographic coordinates of each POI among a plurality of POIs;

determining one or more of the POIs from the plurality of POIs whose geographic coordinates are within the determined geographic bounds of the portion of the digital map selected by the user; and displaying a graphic for each of the determined one or more POIs, wherein the displayed graphic is displayed on the digital map at the geographic coordinates of each of the determined one or more POIs.

23. The method of claim 22, wherein the graphic display is a touch screen.

24. The method of claim 22, wherein the portion of the digital map selected by the user corresponds to a physical area of the graphical display touched by the user.

25. The method of claim 22, wherein the portion of the digital map selected by the user is a polygon, the polygon containing more than four sides.

26. The method of claim 22, wherein in response to receiving additional user input selecting a different region on the digital map, performing the additional steps of:
delimiting the different region on the digital map,
combining the different region with the portion of the digital map selected by the user to form a new selected region; and
determining a new set of one or more POIs corresponding with the new selected region; and
displaying the new set of one or more POIs on the digital map.

27. The method of claim 22, wherein in response to receiving additional user input de-selecting a previously-delimited region on the digital map, performing the additional steps of:
removing graphics indicating the delimiting from the de-selected region on the digital map,
removing the de-selected region from the portion of the digital map selected by the user to form a new selected region; and
removing one or more POIs on the digital map that are outside the new selected region.

28. The method of claim 22, wherein the step of determining one or more of the POIs whose geographic coordinates are within the portion of the digital map selected by the user, further comprises:
determining one or more of the map tiles that contain the selected region;
transmitting the coordinates of the one or more map tiles to a mapping server;
receiving from the mapping server a new set of one or more POIs whose coordinates are within the coordinates of the map tiles;
discarding from the new set of one or more POIs all POIs that are not within the selected region.

* * * * *